United States Patent
Shilts et al.

(10) Patent No.: US 9,947,045 B1
(45) Date of Patent: Apr. 17, 2018

(54) SELECTING PARTICIPANTS IN A RESOURCE CONSERVATION PROGRAM

(71) Applicant: OPOWER, INC., Arlington, VA (US)

(72) Inventors: Erik Shilts, San Francisco, CA (US); Agustin Fonts, Santa Clara, CA (US)

(73) Assignee: OPOWER, Inc., Arlington, VA (US)

( * ) Notice: Subject to any disclaimer, the term of this patent is extended or adjusted under 35 U.S.C. 154(b) by 579 days.

(21) Appl. No.: 14/497,932

(22) Filed: Sep. 26, 2014

Related U.S. Application Data

(60) Provisional application No. 61/937,271, filed on Feb. 7, 2014.

(51) Int. Cl.
| | | |
|---|---|---|
| G06Q 30/00 | (2012.01) | |
| G06Q 40/00 | (2012.01) | |
| G06Q 50/06 | (2012.01) | |

(52) U.S. Cl.
CPC ............ *G06Q 40/00* (2013.01); *G06Q 50/06* (2013.01)

(58) Field of Classification Search
CPC ............... G06Q 40/00; G06Q 30/0207; G06Q 30/0208; G06Q 30/0241; G06Q 30/0242; G06Q 30/0252
See application file for complete search history.

(56) References Cited

U.S. PATENT DOCUMENTS

| | | | |
|---|---|---|---|
| 4,334,275 A | 6/1982 | Levine | |
| 4,843,575 A | 6/1989 | Crane | |
| 5,513,519 A | 5/1996 | Cauger et al. | |
| 5,566,084 A | 10/1996 | Cmar | |
| 5,717,609 A | 2/1998 | Packa et al. | |
| 5,855,011 A | 12/1998 | Tatsuoka | |
| 5,873,251 A | 2/1999 | Iino | |
| 5,930,773 A | 7/1999 | Crooks et al. | |
| 5,948,303 A | 9/1999 | Larson | |
| 6,035,285 A | 3/2000 | Schlect et al. | |
| 6,088,688 A | 7/2000 | Crooks et al. | |
| 6,295,504 B1 | 9/2001 | Ye et al. | |
| 6,327,605 B2 | 12/2001 | Arakawa et al. | |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Lalita M Hamilton
(74) *Attorney, Agent, or Firm* — Cooper Legal Group, LLC

(57) ABSTRACT

A method and system for configuring a resource conservation program that receives information about a level of responsiveness for each of a plurality of users, receives information about resource usage for each of the plurality of users, determines an expected value, using a processor, for each of the plurality of users, using the received information about the level of responsiveness and the received information about resource usage, and configures the resource conservation program based on the determined expected value for each of the plurality of users.

20 Claims, 6 Drawing Sheets

(56) References Cited

U.S. PATENT DOCUMENTS

| | | |
|---|---|---|
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| 7,991,513 B2 | 8/2011 | Pitt |
| 8,065,098 B2 | 11/2011 | Gautam |
| 8,166,047 B1 | 4/2012 | Cohen et al. |
| 8,180,591 B2 | 5/2012 | Yuen et al. |
| 8,239,178 B2 | 8/2012 | Gray et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,478,447 B2 | 7/2013 | Fadell et al. |
| 8,489,245 B2 | 7/2013 | Carrel et al. |
| 8,583,288 B1 | 11/2013 | Rossi et al. |
| 8,630,741 B1 | 1/2014 | Matsuoka et al. |
| 8,660,813 B2 | 2/2014 | Curtis et al. |
| 8,690,751 B2 | 4/2014 | Auphan |
| 8,751,432 B2 | 6/2014 | Berg-Sonne et al. |
| 8,805,000 B2 | 8/2014 | Derby et al. |
| 9,031,703 B2 | 5/2015 | Nakamura et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0103549 A1 | 5/2006 | Hunt et al. |
| 2007/0061735 A1 | 3/2007 | Hoffberg et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0167535 A1 | 7/2008 | Stivoric et al. |
| 2008/0195561 A1 | 8/2008 | Herzig |
| 2008/0281473 A1 | 11/2008 | Pitt |
| 2008/0281763 A1 | 11/2008 | Yliniemi |
| 2008/0306985 A1 | 12/2008 | Murray et al. |
| 2009/0106202 A1 | 4/2009 | Mizrahi |
| 2009/0204267 A1 | 8/2009 | Sustaeta et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0039990 A1* | 2/2014 | Georgi ............... G06Q 30/0229 705/14.3 |
| 2014/0074300 A1 | 3/2014 | Shilts et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0227846 A1 | 8/2015 | Mercer et al. |
| 2015/0267935 A1 | 9/2015 | Devenish et al. |
| 2015/0269664 A1 | 9/2015 | Davidson |
| 2015/0310019 A1 | 10/2015 | Royer et al. |
| 2015/0310463 A1 | 10/2015 | Turfboer et al. |
| 2015/0310465 A1 | 10/2015 | Chan et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |

(56) References Cited

FOREIGN PATENT DOCUMENTS

| WO | WO 2008/101248 | 8/2008 |
|---|---|---|
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May 19, 2008, 15 pages, available at http://web.archive.orgi/web/20080519220643/bie.berkeley.edu/coolcale/calculations.html.
Author Unknown, "Lifecycle Climate Footprint Calculator," Berkeley Institute of the Environmen, Nov. 23, 2007, 6 pages, available at http://web.archive.org/web/200711123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).

Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting—Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f.. uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.

(56) References Cited

OTHER PUBLICATIONS

Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

* cited by examiner

SELECTING PARTICIPANTS IN A RESOURCE CONSERVATION PROGRAM

CROSS-REFERENCE TO RELATED APPLICATION

This application claims priority to and the benefit of U.S. Provisional Patent Application No. 61/937,271, filed on Feb. 7, 2014, the disclosure of which is incorporated by reference herein in its entirety.

BACKGROUND

Field

The present disclosure relates generally to resource conservation and more specifically to selecting resource users as participants in or targets for participation in a resource conservation program.

Description of the Related Art

Various programs have been developed and implemented in an effort to promote resource conservation. Examples of these programs include smart thermostat programs that seek to promote energy efficiency and/or that implement demand response programs which reduce energy usage during peak usage events. These resource conservation programs may have significant costs associated with recruiting and enrolling new participants and/or associated with continued participation in the programs.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
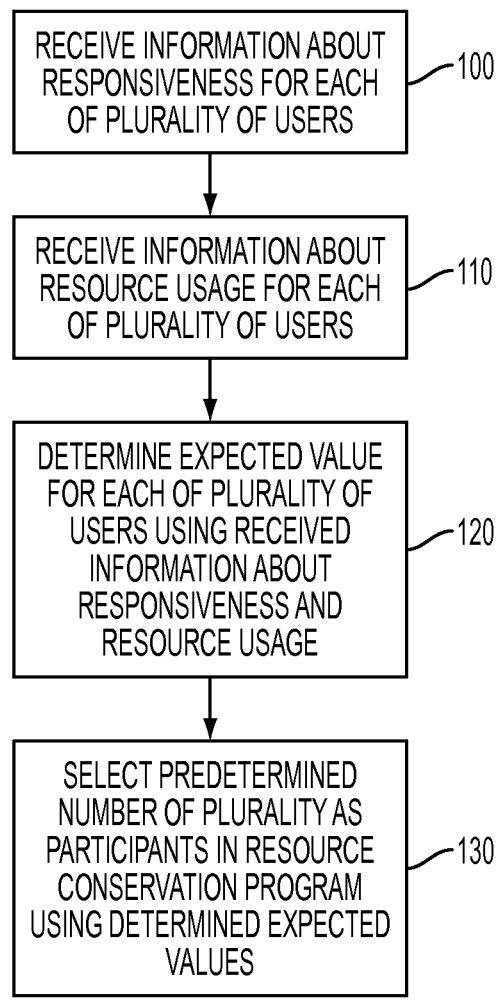
FIG. 1 is a flow diagram illustrating a process for selecting participants in a resource conservation program, according to an embodiment.

According to an embodiment, resource users (e.g., utility customers, homeowners, tenants, building managers, energy users, natural gas users, water users, etc.) may be targeted for participation in a resource conservation program such as a smart thermostat program based on an expected reduction in resource usage through participation in the resource conservation program and/or an expected likelihood of accepting an offer to participate in the resource conservation program. By selectively targeting resource users for participation in the resource conservation program, a greater reduction in resource usage may be attained per dollar spent in recruitment for the resource conservation program.

According to another embodiment, a method for forecasting an expected reduction in resource usage in response to selecting particular resource users or selecting particular groups for participation in a resource conservation program is provided.

Selectively targeting resource users for participation in a resource conservation program according to an embodiment may result in one or more of the following benefits: (1) costs associated with recruiting and enrolling resource users to participate in the resource conservation program (e.g., a smart thermostat program or related program) may be lowered because those resource users who are most likely to accept an offer to participate in the resource conservation program are targeted for recruitment; (2) an average reduction in resource usage per participant in the resource conservation program—and consequently a total reduction in resource usage attributable to the resource conservation program—may be increased because those resource users who have the most potential for reducing resource usage are recruited and enrolled in the resource conservation program; (3) the average reduction in resource usage per participant in the resource conservation program and the total reduction in resource usage attributable to the resource conservation program may be determined by comparing resource usage by the resource users who are participating in the resource conservation program with resource usage by a group of resource users who are not participating in the resource conservation program; (4) resource users who are selectively targeted for participation in the resource conservation program may also be targeted for cross-sell opportunities for similar or complementary resource conservation products (e.g., resource users who are recruited for the resource conservation program may be offered products or services relevant to resource conservation, such as high efficiency home insulation, high efficiency light bulbs, etc.); (5) resource users who do not have smart thermostats may be identified for targeted product offerings; (6) resource users who do not have smart thermostats may be identified to measure the effects of behavioral approaches to reducing resource usage (e.g., a reduction in resource usage by one or more resource users that is attributable to a program that provides the resource users with home resource usage reports describing resource usage and opportunities for reducing resource usage may be determined); (7) predictions may be made regarding resource usage, actions taken to reduce resource usage, and/or purchases of products related to a reduction in resource usage by the resource users selected for participation in the resource conservation program; and/or (8) a reduction in resource usage may be predicted based on a scenario in which a particular set of resource users are selected to participate in the resource conservation program.

FIG. 1 is a flow diagram illustrating a process for selecting participants in a resource conservation program, according to an embodiment.

In block 100, information is received about a level of responsiveness of each of a plurality of resource users from a utility company, a third party data source, or any other database or information source. The information about the level of responsiveness of each of the plurality of resource users may be received over a network connection or retrieved from a computer-readable storage medium.

The information about the level of responsiveness of a resource user may include information about that resource user's past responsiveness to communications or offers. For example, this may include information about one or more of: (1) the resource user's participation in past resource conservation programs; (2) cross-sell purchases by the resource user (e.g., purchases of different services or products or enrollment in different programs related to reducing resource usage, by the resource user); (3) website metrics that indicate a level of engagement by the resource user with a utility website, resource conservation website, resource conservation program website, or other website; or (4) metrics that indicate clicks by the resource user on emails sent to the resource user.

In addition to receiving information about a level of responsiveness of each of a plurality of resource users, in block 100, information about other potential predictors may also be received. According to an embodiment, for each of the plurality of resource users, demographic information and/or psychographic information may be received. For example, demographic information may be received about a resource user's gender, age, homeowner/renter status, employment, and/or location, and psychographic information may be received about a resource user's personality, values, opinions, attitudes, interests, and/or lifestyle. Additionally, information about behavioral indicators that are associated with or relevant to the resource conservation program on offer may be received (e.g., information identifying resource users who fit into a "green" profile may be received). This information may be received from the plurality of resource users, one or more utility companies, one or more third party data providers, government information sources, and/or any other database or information source.

According to yet another embodiment, in block 100, in addition to or instead of the receiving the previously described information, statistics may be received that describe resource usage behaviors by each of the plurality of resource users, or that identify a normative positioning of each of plurality of resource users with regards to resource usage and/or resource conservation. For example, in block 100, information may be received about a neighbor rank calculation that positions a resource user with respect to the resource user's neighbors, based upon a comparison of that resource user's resource usage and/or reduction in resource usage with that of the resource user's neighbors.

Instead of receiving one or more of the aforementioned items of information for each of the plurality of resource users, according to another embodiment, a plurality of resource users may be divided into a plurality of groups, and one or more of the aforementioned items of information may be received for each of the plurality of groups in block 100. For example, for each of a plurality of groups, information about a level of participation in past resource conservation programs by the group as a whole may be received.

The resource users may be divided into the plurality of groups on based on one or more criterion. For example, the resource users may be divided into the plurality of groups by street, neighborhood, zip code, city, county, or other geographical unit. Alternatively or additionally, the resource users may be divided into the plurality of groups based upon information about resource usage for each resource user, demographic information associated with each resource user, a substation of the utility company that serves a particular resource user or other utility structure (e.g., head-end, distribution point, etc.) associated with a particular resource user, and/or any other criterion. The plurality of groups may be predetermined, or may be dynamically determined based upon specified criteria.

The types of information received in block 100 may be the same for each of the plurality of resource users or groups. Alternatively, according to another embodiment, certain types of information may be received for some but not all of the plurality of resource users or groups, and other information may be received for other resource users or groups.

Next, in block 110, information is received about resource usage for each of the plurality of resource users and/or each of the plurality of groups. According to an embodiment, the information about resource usage may include data and statistics that describe past behaviors and resource use. This information may be received from the plurality of resource users, one or more utility companies, one or more third party data providers, government information sources, and/or any other database or information source. The information about the resource usage for each of the plurality of resource users and/or each of the plurality of groups may be received over a network connection or retrieved from a computer-readable storage medium.

According to an embodiment, the data and statistics that describe past behaviors received in block 110 may include: (1) data or predictors of a resource user's (or resource user's household's) type of schedule (e.g., home all day, away during working hours, irregular, etc.); (2) information about a resource user's (or resource user's household's) schedule and occupancy status at each hour of the day, day of week, month, or combination thereof; and/or (3) information about whether or not a resource user has a programmed thermostat.

According to an embodiment, the data and statistics about resource usage received in block 110 may include: (1) information about a resource user's (or resource user's household's) load curve (i.e., variation in resource usage over time) by hour of day, day of week, month of year, or any combination thereof; (2) information about a resource user's (or resource user's household's) neighbor rank or other normative positioning that describes resource use as compared to other resource users; (3) heating and cooling loads in a building associated with a resource user; (4) information about temperature set points of a thermostat in a building associated with a resource user; and/or (5) information about heating and cooling reflection points (i.e., the temperatures at which heating and cooling systems begin operation).

According to another embodiment, the information received in block 100 and/or the information received in block 110 may be subjected to dimensionality reduction to prevent overfitting, remove outliers, and reduce the parameter space. The dimensionality reduction may be performed by calculating principal components or other similar reductions.

Next, in block 120, an expected value of a reduction in resource usage (i.e., an amount by which resource usage is predicted to be reduced) is determined for each of the plurality of resource users and/or each of the plurality of groups. The expected value may be expressed in kilowatt hours (kWh), therms, cubic feet, gallons, or any other unit of measure.

The expected value of the reduction in resource usage may be determined according to an embodiment using [formula 1]:

$$EV = P_{join} * R \qquad \text{[formula 1]}$$

In [formula 1], EV represents the expected value of the reduction in resource usage for a particular resource user (or a particular group), $P_{join}$ represents the probability of the particular resource user (or the particular group) joining the resource conservation program, and R represents the reduction in resource usage for the particular user (or the particular group) expected to occur over a predetermined period of time if the particular user (or the particular group) joins the resource conservation program.

For example, for a particular resource user, it may be determined that the probability of that particular resource user joining the resource conservation program (i.e., $P_{join}$) is 0.40 (i.e., 40%), and in the event that the particular user joins the resource conservation program, the expected reduction in resource usage over the predetermined period of time (i.e., R) is 55 kWh, then the expected value of the reduction in resource usage for the particular user (EV) is determined to be 22 kWh using [formula 1].

The probability of a particular resource user (or a particular group) joining a resource conservation program (i.e., $P_{join}$), which according to an exemplary embodiment is used in determining the expected value of the reduction in resource usage for the particular resource user in block 120 (using [formula 1]), may be determined using the information received about the level of responsiveness of the particular resource user (or the particular group) in block 100. (Note that, according to an embodiment, the probability of a particular group joining a resource conservation program may correspond to a proportion of the resource users within the group that are expected to join the resource conservation program.)

For example, a particular resource user may choose to respond "yes" to a recruitment offer and thus join/participate in a resource conservation program or may choose to respond "no" to the recruitment offer and not join/participate in the resource conservation program. According to an embodiment, a classification model may be used that outputs the predicted classification (i.e., a "yes" or "no" response to the recruitment offer) and an associated confidence of the prediction (i.e., the likelihood of joining or not joining the resource conservation program) for each of the plurality of resource users (or each of the plurality of group).

The classification model may use a logistic regression, random forest, neural network, k-nearest neighbors, or other classification algorithm to predict the classification of each of the plurality of resource users using the information received about the level of responsiveness of the particular resource user (or the particular group) in block 100 as inputs. The classification model may also include regularization parameters to decrease over-fitting and perform dimensionality reduction. According to another embodiment, an ensemble of predictors (i.e., more than one of the aforementioned algorithms) and their collective predictive power may be used by applying a technique such as bootstrap aggregating or Bayesian model combination.

According to an embodiment, logistic regression analysis is used to predict the likelihood of each of the plurality of resource users joining the resource conservation program because of its simplicity and predictive power. Specifically, the logistic regression analysis uses as the target feature (i.e., dependent variable) information about participation in past resource conservation programs (e.g., smart thermostat programs, energy efficiency programs, or other similar programs), received in block 100. The information about participation in past resource conservation programs may be information about whether or not a resource user participated in a past resource conservation program.

The other information described above that is received in block 100 about a level of responsiveness for a resource user is then used as predictors (i.e., independent variables) of the target feature for the logistic regression analysis. These other inputs include, but are not limited to, demographic information and/or psychographic information, information about behavioral indicators that are associated with or relevant to the resource conservation program, and statistics that describe resource usage behaviors or that identify a normative positioning of resource users with regards to resource usage and/or resource conservation. Related variables may also be interacted to try to account for likely sources of variation.

The logistic regression analysis may provide an estimation of the odds of a particular value for the target feature (e.g., a "yes" response to an offer to participate in a resource conservation program). Once trained, the logistic regression may be applied to other resource users to determine their likelihood of responding "yes" to an offer to participate in a resource conservation program.

Referring back to [formula 1] above, the expected reduction in resource usage (i.e., R) for the particular resource user (or the particular group) through participation in the resource conservation program may be determined using the information received about resource usage for the particular resource user (or the particular group) in block 110.

According to an embodiment, the information received about resource usage for the particular resource user (or the particular group) in block 110 may include one or more items of information related to a potential for a reduction in resource usage for the particular resource user (or the particular group). The expected reduction in resource usage R may be determined by assigning weights to each of the one or more items of information related to a potential for a reduction in resource usage received in block 110 and summing the weighted one or more items of information related to a potential for a reduction in resource usage, as shown in [formula 2]:

$$R = w_1 * x_1 + w_2 * x_2 + \ldots + w_n * x_n \quad \text{[formula 2]}$$

In [formula 2], $x_n$ represents an item of information related to a potential for a reduction in resource usage for the particular resource user (or the particular group), and $w_n$ represents the weight assigned to $x_n$.

For example, a particular resource user's neighbor rank that describes resource usage as compared to other resource users may be in the tenth percentile (i.e., 90% of the resource user's neighbors used fewer resources) and thus the potential reduction in resource usage based upon the resource user's neighbor rank may be represented as 0.90 (i.e., the percentile, 0.10 in this example, may be subtracted from 1, and therefore resource users who use comparatively more resources are assigned a higher potential reduction in resource usage). Likewise, the particular resource user may have a home-all-day type schedule, and those resource users who have a home-all-day type schedule may be determined to have a potential reduction in resource usage that is represented as 0.20. Other resource users who have away-at-work type schedules may be determined to have a potential reduction in resource usage that is represented as 0.70.

In this example, the information about a resource user's neighbor rank may be assigned a relatively larger weight such as 0.60, and information about a resource user's type of schedule may be assigned a relatively smaller weight such as 0.40. By applying [formula 2] to the example above, the expected reduction in resource usage R is 0.60*0.90+0.40*0.20=0.62.

According to another embodiment, the expected reduction in resource usage R for the plurality of resource users (or the plurality of groups) through participation in the resource conservation program may be determined using a clustering algorithm that groups resources users (or groups) that are more similar than those in other groups based on a comparison of the information received about resource usage for the plurality of resource users (or the plurality of groups) in block 110.

According to an embodiment, clustering may be performed using a k-means clustering algorithm that partitions the plurality of resource users (or the plurality of groups) into k clusters, where each resource user (or each group) is assigned to the cluster with the nearest expected reduction in resource usage. All of the resource users (or groups) within a cluster may be assigned a particular expected reduction in resource usage R. For example, one or more clusters with large expected reductions in resource usage may be assigned an R of 1, and the remaining clusters with lower expected reductions in resource usage may be assigned a lower value for R. According to an alternative embodiment, some or all of the resource users within one or more clusters with large expected reductions in resource usage may be recruited to participate in a resource conservation program, while resource users within other clusters may not be recruited.

Alternatively, for resource users who are currently participating in or have previously participated in a resource conservation program, a reduction in resource consumption attributable to the resource conservation program may be determined by comparing the resource users' resource usage prior to participation in the resource conservation program to their resource usage while participating in the resource conservation program. For example, smart thermostat information may be received and used in determining the reduction in resource consumption attributable to the resource conservation program. The determined reduction in resource consumption may be used as the target feature (i.e., dependent variable) in a linear regression analysis, and the other information received about resource usage for the resource users (or the groups) in block 110 may be used as predictors (i.e., independent variables) of the target feature for the linear regression analysis. The linear regression model may then be used to determine the expected value of the reduction in resource usage that would result from participation in the resource conservation program, for resource users (or groups) that are not participating in the resource conservation program.

According to yet another embodiment, the expected reduction in resource consumption attributable to the resource conservation program may be modeled directly by constructing a simulation of resource usage and behaviors over the range of training data inputs. For a given set of inputs, the expected change in resource usage may be calculated, and the expected change in resource usage may be used as the target with the simulated inputs as the features.

Once the probability of the resource users (or the groups) joining the resource conservation program $P_{join}$ and the expected reduction in resource usage for the resource users (or the groups) R are determined, the expected value of the reduction in resource usage may be determined as discussed above with respect to [formula 1]. Alternatively, the probability of the resource users (or the groups) joining and the expected reduction in resource usage for the resource users (or the groups) may be weighted differently depending on the goals of the resource conservation program (e.g., maximize resource conservation or minimize program costs). For example, if a goal is to minimize program costs, then the expected value model would weight the probability of joining by 1 and the expected reduction in resource usage by 0. Other combinations may also be constructed to fit the goals of the resource conservation program.

Next, in block 130, a predetermined number of the plurality of resource users are selected as participants in the resource conservation program, using the expected values calculated in block 120. For example, the 10,000 resource users having the highest expected values may be selected as participants in or targets for participation in the resource conservation program. Alternatively, all resource users having an expected value over a predetermined threshold value may be selected as participants in or targets for participation in the resource conservation program.

According to an embodiment, the selected resource users may be selected as targets for participation in the resource conservation program. Each selected target may be provided an invitation to join ("opt into") the resource conservation program or otherwise provide consent to participation in the resource conservation program. If an indication is recited that the selected target joins, opts in, or consents to participation, they may be enrolled in the resource conservation program. According to another embodiment, the selected resource users may be automatically enrolled in the resource conservation program, and they may have an opportunity to request to leave the program ("opt out").

According to an embodiment, if the number of participants in the resource conservation program falls below a threshold number as a result of too few resource users opting into the resource conservation program or as a result of resource users opting out of the resource conservation program, additional resource users having the next highest expected values may be selected as participants or targets for participation in the resource conservation program in block 130.

Alternatively, instead of selecting a predetermined number of participants in or targets for participation in the resource conservation program, a number of participants or targets may be selected based upon a targeted level of energy savings to be realized from the resource conservation program. For example, if the resource conservation program has the target of reducing 1,000,000 kWh of energy use, a sufficient number of energy users having the highest expected values are selected such that their combined expected energy savings is at least 1,000,000 kWh.

According to yet another embodiment, information may be received for an individual resource user in block 100 and block 110, and an expected value for the individual resource user may be determined in block 120. If the expected value for the individual resource user exceeds a predetermined threshold value, the individual resource user may be selected as a target or selected to participate in the resource conservation program in block 130.

Figure 2:
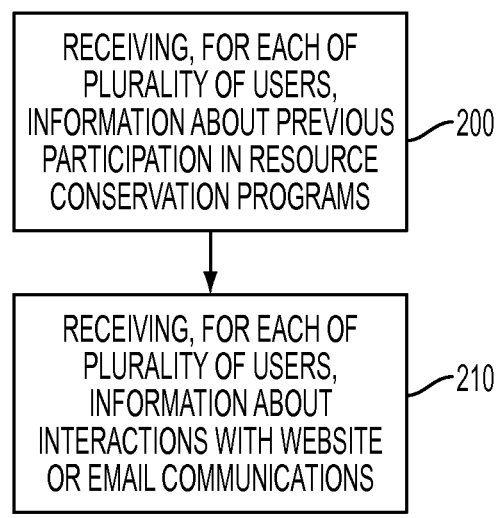
FIG. 2 is a flow diagram illustrating a process for receiving information about a level of responsiveness of a resource user, according to an embodiment.

FIG. 2 is a flow diagram illustrating a process for receiving information about a level of responsiveness of a resource user. According to one embodiment, the process illustrated in FIG. 2 may be performed at block 100 in FIG. 1, discussed above.

In block 200, for each of the plurality of resource users, information is received about previous participation in resource conservation programs. This information may be received from the plurality of resource users, one or more utility companies, one or more third party data providers, government information sources, and/or any other database or information source.

According to an embodiment, information may be received about participation in smart thermostat programs and/or demand response programs. The information may further include information about a number or frequency of "opt outs" in which the resource user has requested to be excluded from a demand response event or other resource usage reduction or peak shaving program. The information may also include information about a quantity or percentage of a resource saved by the resource user through previous participation in resource conservation programs.

Next, in block 210, for each of the plurality of resource users, information is received about interactions with a website or email communications related to resource conservation programs, a utility that supplies a resource, and/or a third party promoting resource conservation or resource conservation programs. This information may be received from the plurality of resource users, one or more utility companies, one or more third party data providers, government information sources, and/or any other database or information source.

According to an embodiment, the information about interactions with a website may include an amount of time spent browsing a website related to resource conservation programs, a utility that supplies a resource, and/or a third party promoting resource conservation or resource conservation programs, a number of pages viewed on the website, information about one or more tasks completed using the website, or any other information regarding the resource user's use of or interaction with the website. The information about interactions with email communications may include information about a number and/or type of emails received by a resource user, information about a number of emails that are viewed by a resource user, information about hyperlinks in email communications that are clicked by the resource user, or any other information regarding the resource user's interaction with email communications related to resource conservation programs, a utility that supplies a resource, and/or a third party promoting resource conservation or resource conservation programs.

Figure 3:
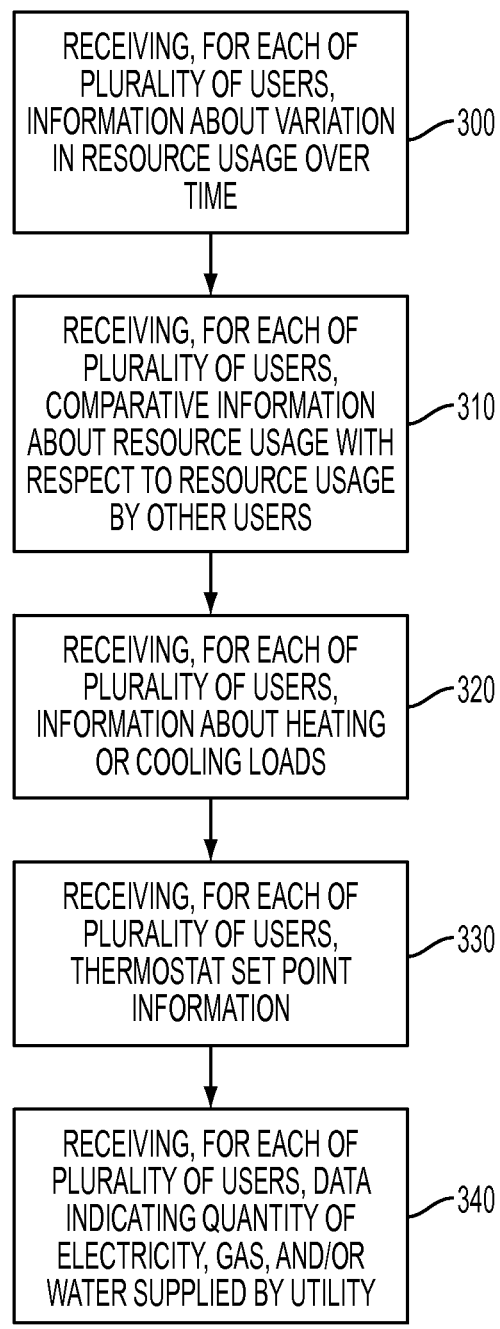
FIG. 3 is a flow diagram illustrating a process for receiving information about resource usage by a resource user, according to an embodiment.

FIG. 3 is a flow diagram illustrating a process for receiving information about resource usage by a resource user, according to an embodiment. This information may be received from the plurality of resource users, one or more utility companies, one or more third party data providers, government information sources, and/or any other database or information source. According to one embodiment, the process illustrated in FIG. 3 may be performed at block 110 in FIG. 1, discussed above.

In block 300, for each of the plurality of resource users, information may be received about variations in resource usage over time (i.e., information about a load curve, as discussed above). Next, in block 310, for each of the plurality of resource users, comparative information about resource usage with respect to resource usage by other resource users may be received. For example, neighbor rank information may be received, as discussed above.

Next, in block 320, for each of the plurality of resource users, information about heating and/or cooling loads may be received. A heating load may be the amount of heat energy that must be added to a space to maintain the temperature in an acceptable range. A cooling load may be the amount of heat energy that must be removed from a space to maintain the temperature in an acceptable range.

Next, in block 330, for each of the plurality of resource users, thermostat set point information may be received. According to an embodiment, the thermostat set point information may include information about schedule periods and thermostat set points associated with the schedule periods. For example, a schedule may include a "sleep" period from 11:00 p.m. to 7:00 a.m. with an associated cooling set point of 75° F., a "wake" period from 7:00 a.m. to 8:00 a.m. with an associated cooling set point of 72° F., an "away" period from 8:00 a.m. to 6:00 p.m. with an associated cooling set point of 80° F., and a "return home" period from 6:00 p.m. to 11:00 p.m. with an associated cooling set point of 72° F. Alternatively, in block 330, information may be received about a thermostat set point and a time at which the thermostat set point was effective.

Finally, in block 340, for each of the plurality of resource users, data indicating a quantity of electricity, gas, water, and/or other resource supplied to the resource users may be received. The resource usage information may be expressed as a quantity of electricity (e.g., a certain number of kilowatt-hours), a quantity of natural gas (e.g., a certain number of therms or cubic feet), or a quantity of any other resource (e.g., steam, hot water, heating oil, coal, etc.) supplied by a utility or resource provider. The resource usage information may be provided in various resolutions, including hourly, daily, monthly, or seasonal resolutions. The resource usage information may be provided by the plurality of resource users, one or more utility companies, one or more third party data providers, government information sources, and/or any other database or information source.

According to another embodiment, the average reduction in resource usage per participant in the resource conservation program and the total reduction in resource usage attributable to the resource conservation program may be determined by comparing resource usage by the resource users who are participating in the resource conservation program with resource usage by a group of resource users who are not participating in the resource conservation program. For example, an artificial control group may be established by selecting resource users who are not participating in the resource conservation program but whose received resource usage information is similar to that of the resource users who are participating in the resource conservation program. At various time points, comparisons may be made regarding the resource usage by the resource users participating in the resource conservation program and the resource usage by the resource users in the artificial control group. These comparisons may be used to determine a quantity of resources saved per resource user, per group, or program-wide.

Figure 4:
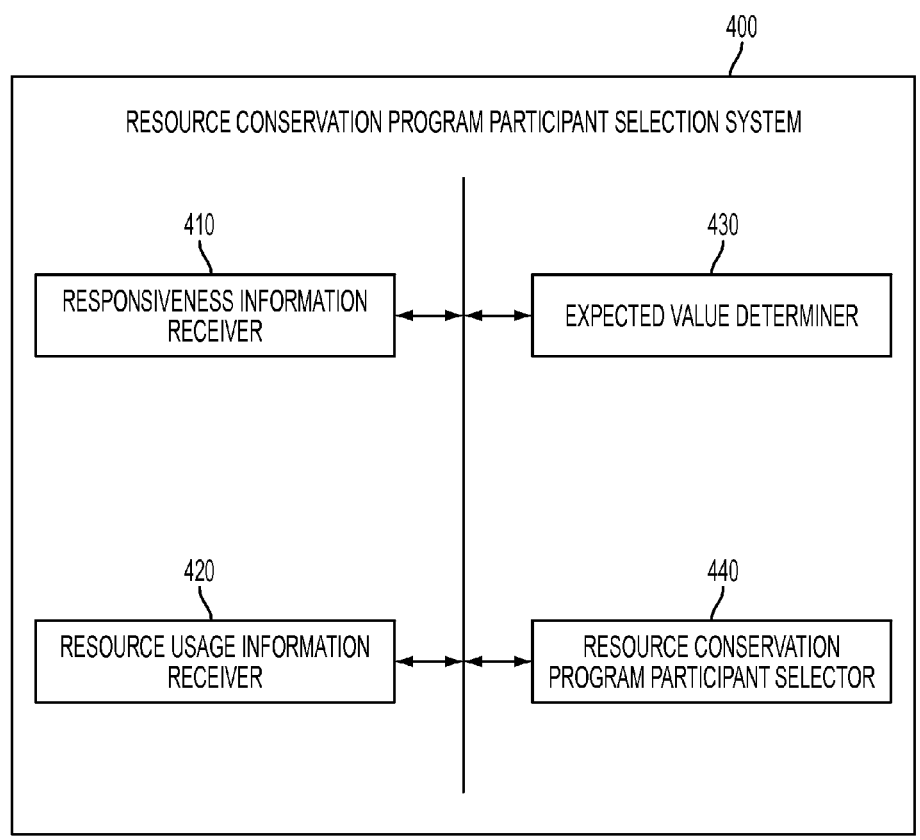
FIG. 4 is a block diagram illustrating a system for selecting participants in a resource conservation program, according to an embodiment.

FIG. 4 is a block diagram illustrating a system for selecting participants in a resource conservation program, which includes a responsiveness information receiver 410, a resource usage information receiver 420, an expected value determiner 430, and a resource conservation program participant selector 440.

According to an embodiment, the responsiveness information receiver 410 receives information about a level of responsiveness of each of a plurality of resource users. This information may include information about that resource user's past responsiveness to communications or offers. The resource usage information receiver 420 receives information about resource usage for each of the plurality of resource users. The information about resource usage may include data and statistics that describe past behaviors and resource use. The expected value determiner 430 determines an expected value of a reduction in resource usage for each of the plurality of resource users using the information received about responsiveness by the responsiveness information receiver 410 and the information received about resource usage by the resource usage information receiver 420. Finally, the resource conservation program participant selector 440 selects a predetermined number of the plurality of resource users as participants in or targets for participation in the resource conservation program using the expected values determined for each of the plurality of resource users by the expected value determiner 430.

Figure 5:
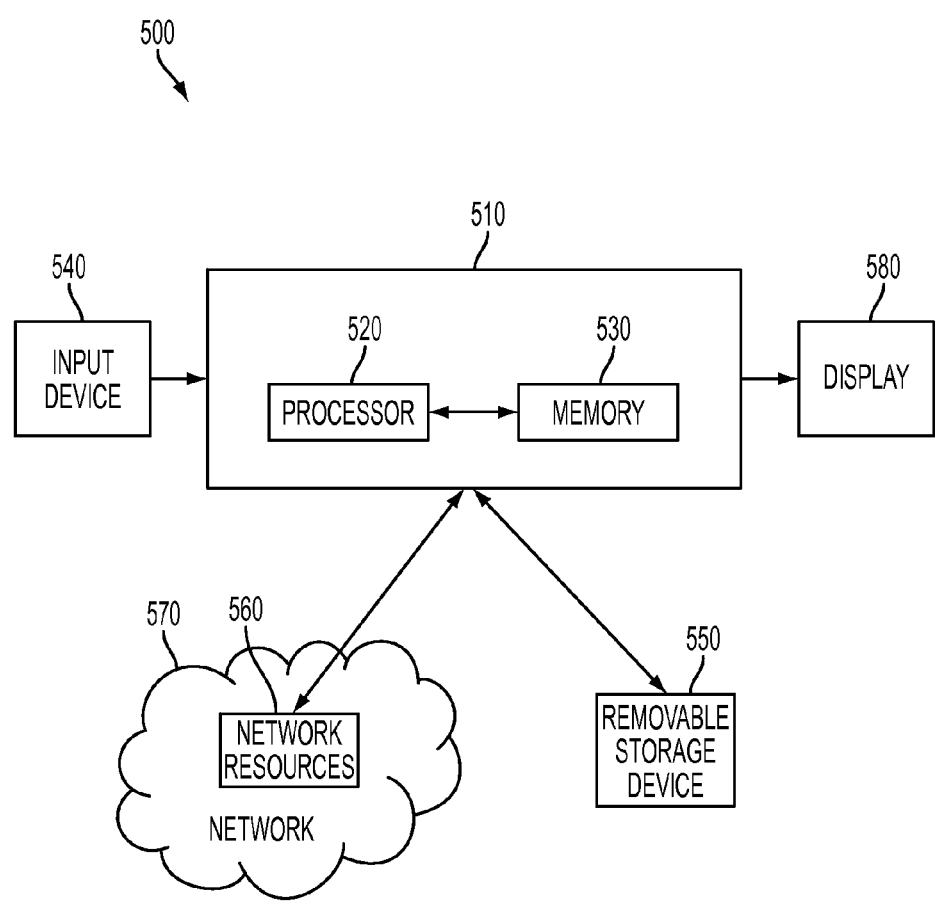
FIG. 5 is a block diagram illustrating a computer system upon which the system for selecting participants in a resource conservation program may be implemented, according to an embodiment.

FIG. 5 is a block diagram illustrating a computer system 500 upon which the system for selecting participants in a resource conservation program may be implemented, according to an embodiment. The system 500 includes a computer/server platform 510 including a processor 520 and memory 530 which operate to execute instructions, as known to one of skill in the art. The term "computer-readable storage medium" as used herein refers to any tangible medium, such as a disk or semiconductor memory, that participates in providing instructions to processor 520 for execution. Additionally, the computer platform 510 receives input from a plurality of input devices 540, such as a keyboard, mouse, touch device, touchscreen, or microphone. The computer platform 510 may additionally be connected to a removable storage device 550, such as a portable hard drive, optical media (CD or DVD), disk media, or any other tangible medium from which a computer can read executable code.

The computer platform 510 may further be connected to network resources 560 which connect to the Internet or other components of a local public or private network. The network resources 560 may provide instructions and data to the computer platform 510 from a remote location on a network 570. The connections to the network resources 560 may be via wireless protocols, such as the 802.11 standards, Bluetooth® or cellular protocols, or via physical transmission media, such as cables or fiber optics. The network resources may include storage devices for storing data and executable instructions at a location separate from the computer platform 510. The computer platform 510 interacts with a display 580 to output data and other information to a utility customer, tenant, or other user, as well as to request additional instructions and input from the utility customer, tenant, or other user. The display 580 may be a touchscreen display and may act as an input device 540 for interacting with a resource user, utility customer, tenant, or other user.

Figure 6:
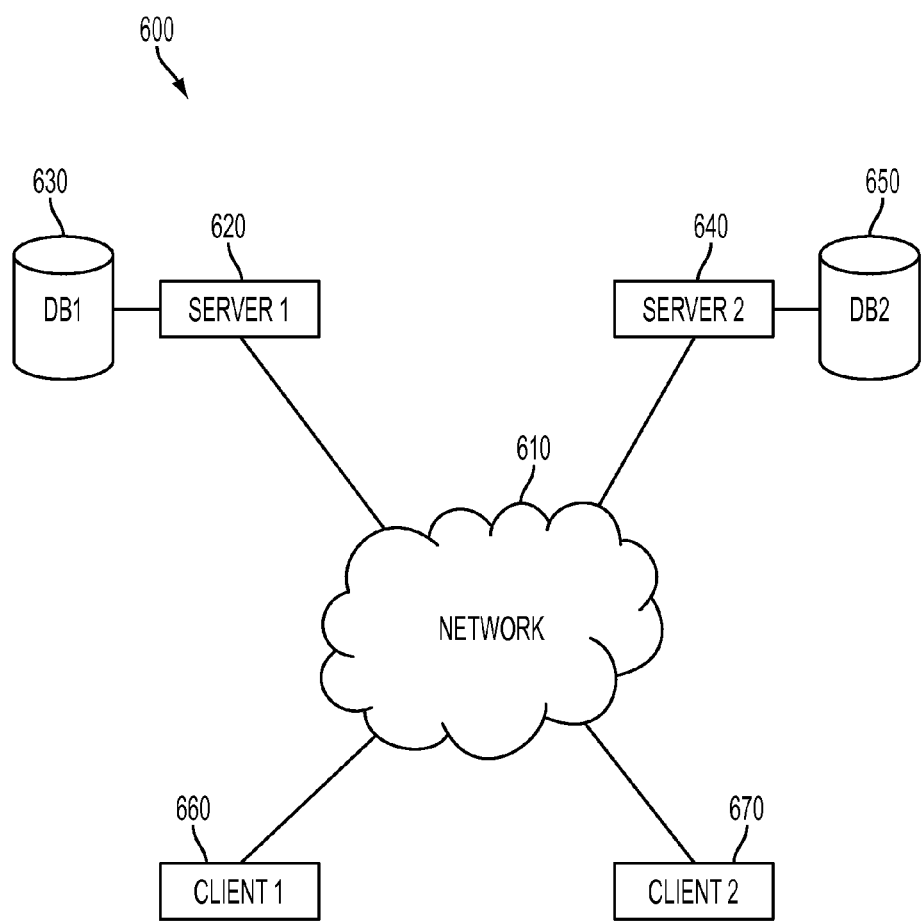
FIG. 6 is a block diagram that illustrates an embodiment of a network including servers upon which the system may be implemented and client machines that communicate with the servers.

FIG. 6 is a block diagram that illustrates an embodiment of a network 600 including servers 620, 640 upon which the system may be implemented and client machines 660, 670 that communicate with the servers 620, 640. The client machines 620, 640 communicate across the Internet or another wide area network (WAN) or local area network (LAN) 610 with server 1 620 and server 2 640. Server 1 620 communicates with database 1 630, and server 2 640 communicates with database 2 650. According to an embodiment, one or both of server 1 620 and server 2 640 may implement a system for selecting participants in or targets for participation in a resource conservation program. Client 1 660 and/or client 2 670 may interface with the system and request server 1 620 and/or server 2 640 to perform processing. Server 1 620 may communicate with or otherwise receive information from database 1 630 or another internal or external data source or database in the process of selecting participants in or targets for participation in a resource conservation program, and server 2 640 may communicate with database 2 650 or another internal or external data source or data base in the process of selecting participants in or targets for participation in a resource conservation program.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A method performed by a computing system using one or more processors, the method comprising:
   receiving, by the one or more processors, information about past interactions, by a plurality of users, with one or more websites associated with resource conservation;
   predicting, by the one or more processors, a level of responsiveness to an offer for each of the plurality of users based upon the information;
   receiving, by the one or more processors, information about resource usage for each of the plurality of users;
   determining, by the one or more processors, an expected value of a reduction in the resource usage for each user of the plurality of users based upon:
      (i) the level of responsiveness for the corresponding user, and
      (ii) the received information about resource usage for the corresponding user,
      wherein the expected value of the reduction in resource usage corresponds to an amount by which the resource usage associated with the corresponding user is predicted to be reduced in association with a resource conservation program;
   generating, by the one or more processors, a target set of users from the plurality of users, to invite to participate in the resource conservation program by:
      (i) comparing, by the one or more processors, the expected value of the reduction in resource usage for each user with a defined threshold of reduction in resource usage; and
      (ii) selecting and adding in the target set of users, by the one or more processors, at least one user with an expected value of reduction in resource usage that exceeds the defined threshold of reduction in resource usage;
   generating, by the one or more processors using the target set of users, an invitation to participate in the resource conservation program for each user in the target set of users, wherein the invitation includes a selectable option to join the resource conservation program; and
   controlling transmission of the invitation based on the target set of users, wherein the invitation is transmitted, by the one or more processors via a network communication, to only remote devices associated with each user in the target set of users, wherein the computing system is caused to add a user to the resource conservation program in response to the selectable option in the invitation being selected by the user.

2. The method of claim 1, wherein the resource conservation program is directed to reducing an amount of electrical energy used by the plurality of users.

3. The method of claim 1, wherein the selecting and adding of the at least one user comprises selecting a predetermined number of the plurality of users as participants in or targets for participation in the resource conservation program.

4. The method of claim 1, wherein the determining is performed using information about previous participation in energy efficiency programs by each user.

5. The method of claim 1, wherein the receiving information about resource usage for each of the plurality of users comprises receiving, for each user, at least one of information about a variation in resource usage by the user over time, comparative information about resource usage by the user with respect to resource usage by other users, information about heating or cooling loads, or thermostat set point information.

6. The method of claim 1, wherein the receiving information about resource usage for each of the plurality of users comprises receiving, for each user, data indicating a quantity of at least one of electricity, gas, or water supplied by a utility to a location corresponding to the user over a plurality of days.

7. The method of claim 1, further comprising receiving information about an occupancy schedule for a building associated with each of the plurality of users, and
wherein the determining the expected value for each of the plurality of users further comprises using the received information about the occupancy schedule.

8. A non-transitory computer readable medium storing a program causing a computer to execute a method, the method comprising:
predicting a level of responsiveness corresponding to a user based on at least received information about responsiveness for the user;
calculating a resource savings value corresponding to the user, wherein the calculating the resource savings value is based on at least received information about resource usage for the user, the resource savings value representing an expected reduction in resource usage for the user from participation in a resource conservation program;
determining an expected value of a reduction in the resource usage, by a processor, for the user, based on at least:
(i) the predicted level of responsiveness corresponding to the user, and
(ii) the calculated resource savings value corresponding to the user;
generating, by the processor, a target set of users to invite to participate in the resource conservation program by:
(i) comparing, by the processor, the expected value of the reduction in resource usage for the user with a defined threshold of reduction in resource usage; and
(ii) selecting and adding in the target set of users, by the processor, at least the user responsive to determining that the expected value of reduction in resource usage exceeds the defined threshold of reduction in resource usage;
generating, by the processor using the target set of users, an invitation to participate in the resource conservation program for each user in the target set of users, wherein the invitation includes a selectable option to join the resource conservation program; and
controlling transmission of the invitation based on the target set of users, wherein the invitation is transmitted, by the processor via a network communication, to only remote devices associated with each user in the target set of users, wherein the computer is caused to add at least one user to the resource conservation program in response to the selectable option in the invitation being selected by the at least one user.

9. The non-transitory computer readable medium of claim 8, wherein the determined expected value for the user is an amount by which resource usage is predicted to be reduced in response to selecting the user as a target for participation in the resource conservation program, and
wherein the determined expected value for the user is determined using the calculated resource savings value corresponding to the user and a probability of the user participating in the resource conservation program that is determined using the level of responsiveness corresponding to the user.

10. The non-transitory computer readable medium of claim 8, further comprising, in response to the determined expected value of the user exceeding a threshold value, selecting the user as a participant in the resource conservation program.

11. The non-transitory computer readable medium of claim 8, further comprising enrolling the user in the resource conservation program in response to receiving an indication that the user consents to participation in the resource conservation program.

12. The non-transitory computer readable medium of claim 8, wherein the received information about responsiveness for the user comprises at least one of information about previous participation in energy efficiency programs by the user or information about interactions by the user with a website or email communications.

13. The non-transitory computer readable medium of claim 8, wherein the received information about resource usage for the user comprises at least one of information about a variation in resource usage by the user over time, comparative information about resource usage by the user with respect to resource usage by other users, information about heating or cooling loads, or thermostat set point information.

14. The non-transitory computer readable medium of claim 8, further comprising receiving information about an occupancy schedule for a building associated with the user, and
wherein the determining the expected value for the user further comprises using the receiving information about the occupancy schedule.

15. A system, comprising:
a processor; and
memory comprising instructions that when executed by the processor implement:
a responsiveness information receiver configured to receive information about past interactions of a user with one or more websites associated with resource conservation;
a predictor configured to predict a level of responsiveness to an offer for the user based upon the information;
a resource usage information receiver configured to receive information about resource usage for the user;

an expected value determiner configured to determine an expected value of a reduction in the resource usage, by the processor, for the user, based upon the level of responsiveness and the information about resource usage received by the resource usage information receiver; and a resource conservation program participant selector configured to:
  generate, by the processor, a target set of users to invite to participate in a resource conservation program by:
    (i) comparing, by the processor, the expected value of the reduction in resource usage for the user with a defined threshold of reduction in resource usage; and
    (ii) selecting and adding in the target set of users, by the processor, at least the user based upon the comparison;
  generate, by the processor using the target set of users, an invitation to participate in the resource conservation program for each user in the target set of users, wherein the invitation includes a selectable option to join the resource conservation program; and
  control transmission of the invitation based on the target set of users, wherein the invitation is transmitted, by the processor via a network communication, to only remote devices associated with each user in the target set of users, wherein the system is caused to add at least one user to the resource conservation program in response to the selectable option in the invitation being selected by the at least one user.

16. The system of claim 15, wherein the expected value for the user determined by the expected value determiner is an expected amount of resources saved in response to selecting the user as a target for participation in the resource conservation program.

17. The system of claim 15, wherein the resource conservation program participant selector is configured to determine that the expected value of the user exceeds the defined threshold of reduction in resource usage.

18. The system of claim 15, wherein the determining is performed using information about previous participation in resource conservation programs by the user.

19. The system of claim 15, wherein the information about resource usage for the user received by the resource usage information receiver comprises receiving at least one of information about a variation in resource usage by the user over time, comparative information about resource usage by the user with respect to resource usage by other users, information about heating or cooling loads, thermostat set point information, or data indicating a quantity of at least one of electricity, gas, or water supplied by a utility to a location corresponding to the user over a plurality of days.

20. The system of claim 15, further comprising an occupancy schedule information receiver configured to receive information about an occupancy schedule for a building associated with the user, and
  wherein the expected value determiner uses the information about the occupancy schedule received by the occupancy schedule information receiver.

* * * * *